US008410956B2

United States Patent
Bai et al.

(10) Patent No.: US 8,410,956 B2
(45) Date of Patent: Apr. 2, 2013

(54) MESSAGE MANAGEMENT PROTOCOL PERSISTENT GEOCAST ROUTING

(75) Inventors: Fan Bai, Troy, MI (US); Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1349 days.

(21) Appl. No.: 11/839,700

(22) Filed: Aug. 16, 2007

(65) Prior Publication Data

US 2009/0045977 A1 Feb. 19, 2009

(51) Int. Cl.
*G08G 1/09* (2006.01)
*G08G 1/00* (2006.01)
*G08G 1/16* (2006.01)
*B60Q 1/00* (2006.01)
*G01R 31/08* (2006.01)
*H04L 12/28* (2006.01)
*H04B 7/00* (2006.01)

(52) U.S. Cl. ........ 340/905; 340/902; 340/903; 340/436; 370/229; 370/254; 370/390; 455/41.2; 455/518; 455/519

(58) Field of Classification Search .................... 340/905
See application file for complete search history.

(56) References Cited

U.S. PATENT DOCUMENTS

| | | | |
|---|---|---|---|
| 6,445,308 B1 | 9/2002 | Koike | |
| 6,765,495 B1 | 7/2004 | Dunning et al. | |
| 6,985,089 B2 | 1/2006 | Liu et al. | |
| 7,027,773 B1 * | 4/2006 | McMillin | 455/41.2 |
| 7,427,929 B2 * | 9/2008 | Bauer et al. | 340/905 |
| 7,466,664 B2 * | 12/2008 | Ghosh et al. | 370/254 |
| 2002/0135467 A1 | 9/2002 | Koike | |
| 2003/0006889 A1 | 1/2003 | Koike | |
| 2003/0009275 A1 | 1/2003 | Koike | |
| 2005/0088318 A1 | 4/2005 | Liu et al. | |

(Continued)

FOREIGN PATENT DOCUMENTS

| | | |
|---|---|---|
| DE | 10 2005 013 648 A1 | 9/2006 |
| EP | 1 286 507 A1 | 2/2003 |

(Continued)

OTHER PUBLICATIONS

Abdelmalik Bachir and Abderrahim Benslimane, "A Multicast Protocol in Ad hoc Networks Inter-Vehicle Geocast" (Proceedings of the 58th IEEE Vehicular Technology Conference, fall, 2003, vol. 57, issue 4, pp. 2456-2460).*

*Primary Examiner* — Jennifer Mehmood
*Assistant Examiner* — John Mortell
(74) *Attorney, Agent, or Firm* — John A. Miller; Miller IP Group, PLC

(57) ABSTRACT

A system and method for providing a protocol to maintain a persistent warning message in a region of interest. The protocol begins its operation when a hazardous condition is detected by a vehicle. The detecting vehicle uses a multi-hop geocast broadcasting process to transmit a warning message to other vehicles in the region of interest. When the vehicles in the region of interest receive the warning message, they are prevented from re-broadcasting the message for a first predetermined period of time. After the first predetermined period of time has expired, a contentious timing process is used to determine which of those vehicles will re-broadcast the message to other vehicles entering the region of interest. This process of re-broadcasting continues until a second predetermined period of time expires at which time the message is not re-broadcast.

20 Claims, 2 Drawing Sheets

U.S. PATENT DOCUMENTS

| | | |
|---|---|---|
| 2005/0222716 A1 | 10/2005 | Tengler et al. |
| 2005/0265256 A1 | 12/2005 | Delaney |
| 2006/0232439 A1 | 10/2006 | Reumermann |
| 2008/0002573 A1* | 1/2008 | Mosko et al. ............... 370/229 |
| 2008/0186206 A1* | 8/2008 | Reumerman ............... 340/902 |

FOREIGN PATENT DOCUMENTS

WO    WO 2007/091219 A1    8/2007

* cited by examiner

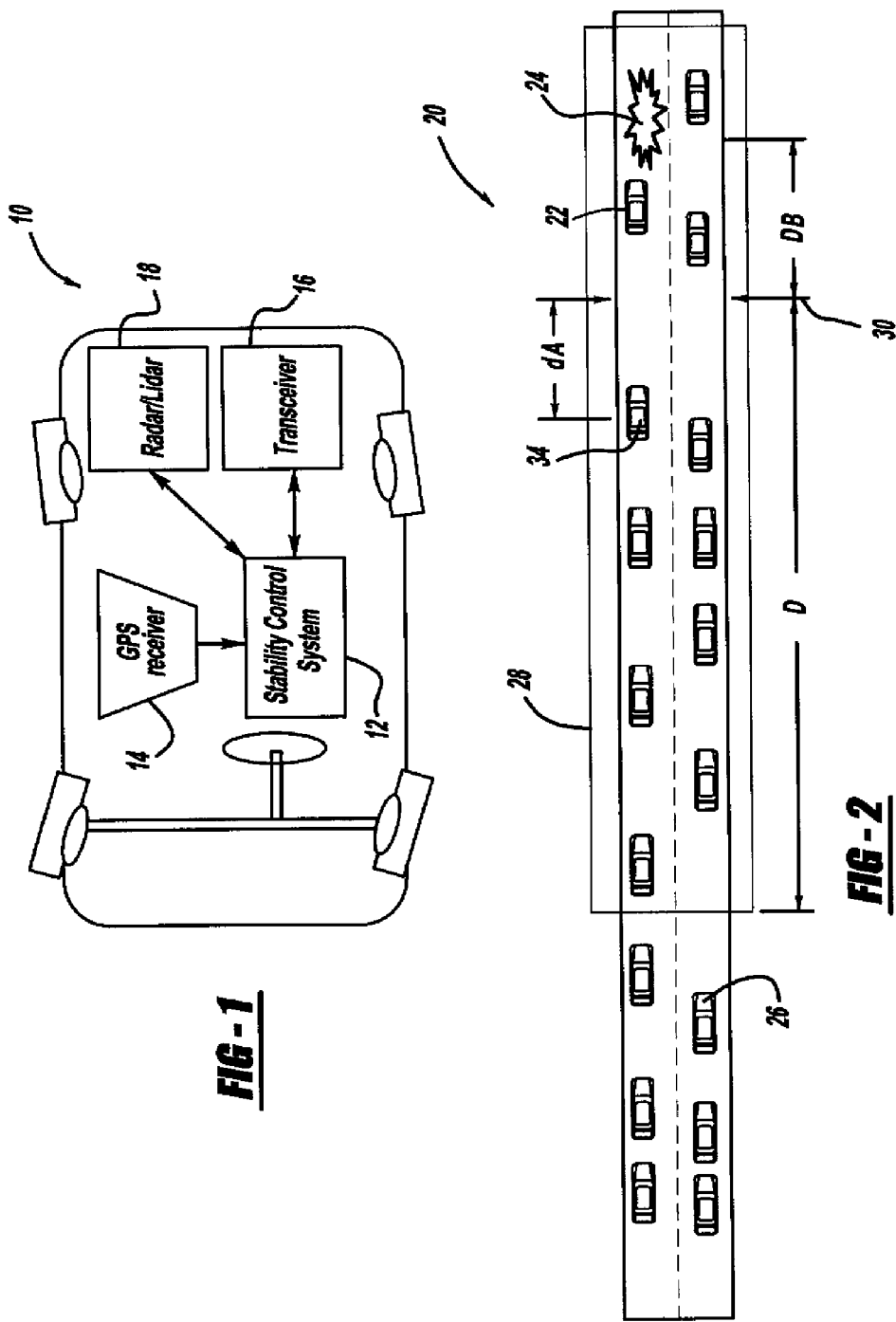

MESSAGE MANAGEMENT PROTOCOL PERSISTENT GEOCAST ROUTING

BACKGROUND OF THE INVENTION

1. Field of the Invention

This invention relates generally to a protocol for transmitting messages to a group of vehicles and, more particularly, to a protocol for continually transmitting messages to a group of vehicles for a certain period of time and within a certain region in response to a detected hazardous road condition.

2. Discussion of the Related Art

Traffic accidents and roadway congestion are significant problems for vehicle travel. Vehicular ad-hoc network based active safety and driver assistance systems are known that allow a vehicle communications system to transmit messages to other vehicles in a particular area with warning messages about dangerous road conditions, driving events, accidents, etc. In these systems, multi-hop geocast routing protocols, known to those skilled in the art, are commonly used to extend the reachability of the warning messages, i.e., to deliver active messages to vehicles that may be a few kilometers away from the road condition, as a one-time multi-hop transmission process. In other words, an initial message advising drivers of a potential hazardous road condition is transferred from vehicle to vehicle using the geocast routing protocol so that vehicles a significant distance away will receive the messages because one vehicle's transmission distance is typically relatively short.

Warning messages for active safety and driver assistance applications may need to be temporally persistent in nature. In other words, it may be desirable for certain roadway conditions that the warning message be maintained for an extended period of time because of the length of the time the condition may exist, and also to make sure the intended warning is received by all approaching vehicles. For example, an icy patch on a roadway may take several hours to melt, which requires a continuous message to be transmitted to vehicles approaching the hazard area.

SUMMARY OF THE INVENTION

In accordance with the teachings of the present invention, a system and method are disclosed for providing an application-layer message management protocol to maintain a persistent warning mechanism in a region of interest under a connected and dynamic vehicular networking environment. The protocol begins its operation when a hazardous road condition is detected by a vehicle. The detecting vehicle uses a multi-hop geocast broadcasting process to transmit a warning message to other vehicles in the region of interest. When the vehicles in the region of interest receive the warning message, they do not re-broadcast the message for a first predetermined period of time. After the first predetermined time period has expired, a contentious timing process is used to determine which of those vehicles that have received the message will re-broadcast the message to other vehicles entering the region of interest that have not yet received the warning message. This process of re-broadcasting the message continues until a second predetermined period of time has elapsed at which time the message is not re-broadcast.

Additional features of the present invention will become apparent from the following description and appended claims, taken in conjunction with the accompanying drawings.

BRIEF DESCRIPTION OF THE DRAWINGS

FIG. 1 is a plan view of a vehicle including various systems for detecting road conditions and transmitting messages;

FIG. 2 is a plan view of a roadway on which vehicles are traveling showing particular distances for an application-layer message management protocol, according to an embodiment of the present invention.

DETAILED DESCRIPTION OF THE EMBODIMENTS

Figure 3:
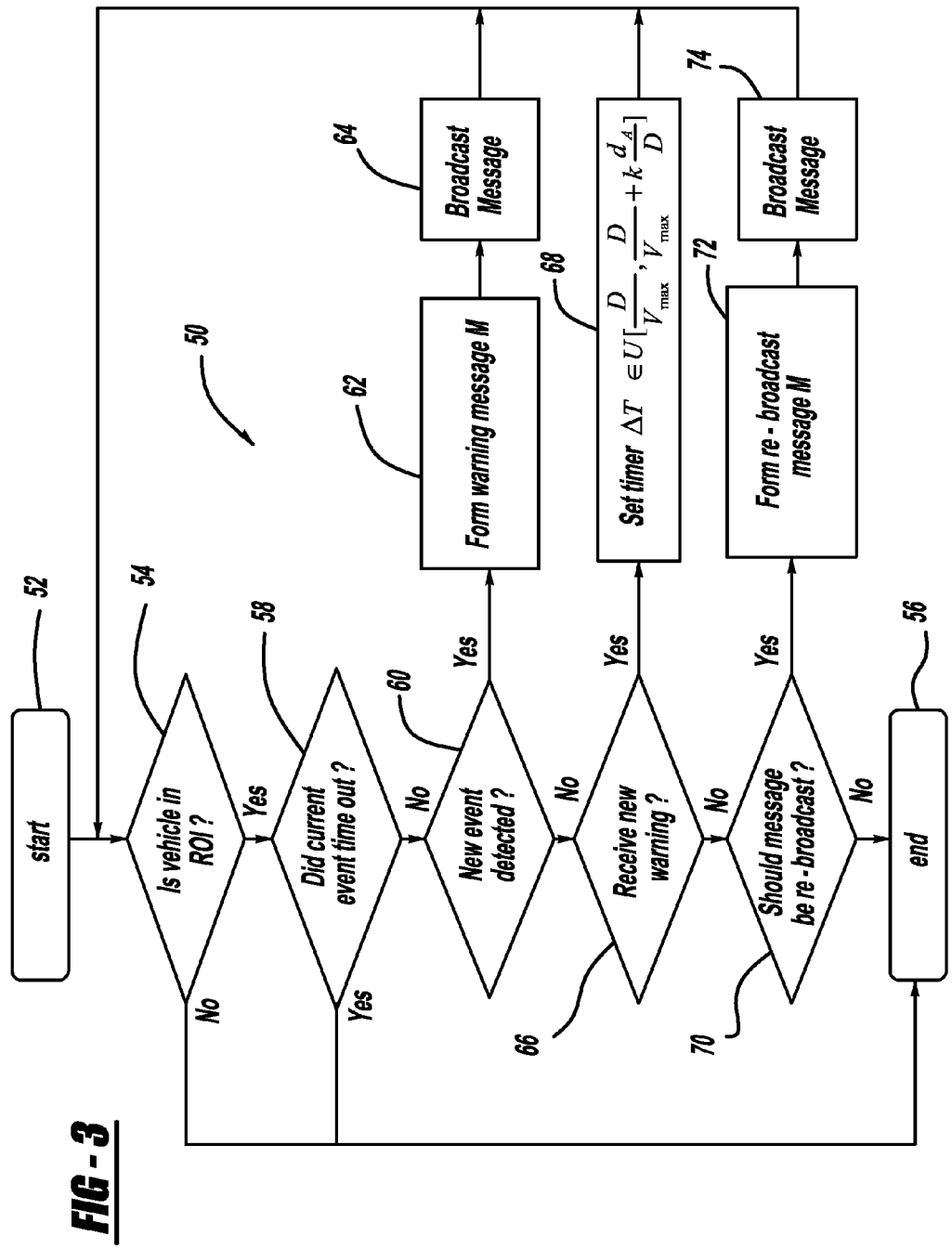
FIG. 3 is a flow chart diagram showing a process for the message management protocol of the invention.

The following discussion of the embodiments of the invention directed to an application-layer message management protocol for providing warnings messages to vehicles of a hazardous road condition is merely exemplary in nature, and is in no way intended to limit the invention or its applications or uses. For example, the message management protocol of the invention has particular application for warning vehicles of an upcoming hazardous road condition. However, the message management protocol of the invention may have application for other situations.

The present invention proposes an application-layer message management protocol that maintains a persistent warning message in a region of interest (ROI) for a dynamic vehicle environment. The message management protocol does not require the assistance of any road-side infrastructures. The message management protocol is built on known geocast routing systems and techniques, and provides an operation to continuously transfer a message host, and thus, keep the presence of a warning message in a vehicle ad-hoc network by a timer-based leadership-contention algorithm. In addition, the message management protocol is able to generate the warning message based on detected hazardous road conditions and eliminate the warning message after the condition ceases to exist. In this way, the message management protocol provides a complete efficient technical solution to generate warning messages, keep the warning message alive in the ROI by migrating a message host and eliminate the warning message in the network when the warning is no longer required.

To satisfy both spatial and temporal constraints for the warning messages, it is necessary to provide an upper-layer message management protocol to maintain the warning messages for some duration under a highly dynamic network topology. To perform the protocol design, certain things need to be addressed, such as how to generate the warning messages, how to maintain the broadcast initiator, i.e., the message host, within a region of interest under a highly dynamic network topology, and how to eliminate the warning messages.

To provide such a message protocol, the present invention increases the design modularity by decoupling the network-layer protocol from the application-layer protocol. Here, a network-layer geocast routing protocol provides the mechanisms of instantaneously delivering warning messages from a message host to vehicles in the region of interest in a controlled manner. The application-layer message management protocol provides support to generate, maintain and then eliminate the warning message within the region of interest after a certain time period has passed.

As discussed above, the present invention is based on message transmissions between vehicles that provide a warning of an upcoming hazardous road condition. It is assumed that each vehicle being discussed herein with respect to the invention has this capability. Typical systems of this type being developed in the art allow a vehicle to broadcast messages to other vehicles over a range of about 250 meters. By using such systems, cellular telephone and other infrastructure related communications systems are not necessary, which saves cost and eliminates the dependency on third party systems.

FIG. 1 is a representation of a vehicle 10 that includes a stability control system 12, a GPS receiver 14, a transceiver 16 and a lidar, radar, vision or other sensing device 18 that may be used for the message management protocol of the invention.

FIG. 2 is a plan view of a roadway 20 on which a plurality of vehicles 26 are traveling. A detecting vehicle 22 may encounter a hazardous region 24, such as an ice patch, oil slick, pot hole, accident, etc. that may cause traffic flow problems or possibly an accident. When the vehicle 22 encounters the hazard region 24, its stability control system 12, the device 18 or another suitable detection device may recognize that there is a problem as a result of wheel slip, vehicle yaw-rate changes, visual indication of an accident, etc. For example, vehicle stability control sensors can detect ice or oil patches, radar/lidar/vision sensors are able to detect other vehicles that have crashed or are stopped, etc.

The detecting vehicle 22 generates a warning message M that may include various data fields, such as event type E, event location L, event duration T, event detection time-stamp $t_0$, message sequence number $S_0$ and message broadcast time-stamp $t_m$. In this manner, the detecting vehicle 22 becomes a message broadcast initiator or message host. The vehicle 22 will then broadcast the message M through the transceiver 16 to provide an indication of the location and type of the problem to the vehicles 26 behind it. The messages are broadcast to the other vehicles 26 within a region of interest 28 that starts in front of the hazard region 24 to some predetermined distance behind it. The vehicles 26 within the region of interest 28 will receive the message M through geocast transmissions that hop from one vehicle to another in a manner that is well understood in the art. In other words, the vehicles 26 within the region of interest 28 will receive the initial message broadcasted by the detecting vehicle 22 by transmissions from one vehicle to another vehicle.

A number of parameters are shown in FIG. 2 that are used by the protocol of the invention. A critical line 30 is a defined virtual line just behind the hazard region 24. A distance D is the distance from the critical line 30 to a back end of the region of interest 28. A distance $D_B$ is the distance from the critical line 30 to the hazard region 24, and is the minimal distance necessary for slow down, stop or detour to avoid or mitigate the hazard region 24. A distance $d_A$ is the distance from the critical line 30 to a re-broadcast vehicle 34 that will re-broadcast the message after a certain time period as a new host vehicle. The original message may include a code that states how many times the message M should be re-broadcast.

After the vehicles 26 within the region of interest 28 have received the warning message M, the vehicles 26 know to keep silent or not broadcast any related warning messages for a predetermined time period duration $\Delta T$ defined as:

$$\Delta T = D/V_{max} \tag{1}$$

Where $V_{max}$ is the maximum allowed velocity of the vehicles on the roadway 20. The optimum $V_{max}$ for any given day, time, locality can be estimated directly through traffic density measurements, digital roadmaps or other suitable local traffic information.

After the vehicle 22 leaves the region of interest 28, the vehicle 22 is no longer part of the message transmission network and will relinquish its position as being the message host. However, the hazard region 24 may persist for some significant period of time after the detecting vehicle 22 has detected it, so the warning message M must then be sent to new vehicles 26 entering the region of interest 28 after the initial broadcast. Thus, the duty of hosting the message and initiating the re-broadcast of the message M will be transferred to another vehicle in the region of interest 28 based on certain criteria. According to the invention, one of the vehicles, such as vehicle 34 near the critical line 30, will become the new host vehicle by using a timer-based leadership contention scheme.

After the period $\Delta T$ has expired, each vehicle 26 that has received the warning message in the region of interest 28 sets a timer at a random time $t_i$ that is uniformly distributed within a time interval as:

$$t_i \in \left[0, k \frac{d_A}{D}\right] \tag{2}$$

The vehicle 26 whose timer expires first will be the new host vehicle and will initiate the re-broadcasting of the message M within the region of interest 28. Because the timer in each vehicle 26 is set proportional to the distance $d_A$ as shown above in (2), the vehicle 26 closest to the critical line 30 will generally be the one to re-broadcast the message M, which suppress other vehicles 26 from re-broadcasting because they will be prevented from broadcasting for the new time $\Delta T$. In other words, when the vehicle 26 within the region of interest 28 receive the initial message M, they do not re-broadcast the message for a period of time as discussed above as they are traveling through the region of interest 28. When the time period $\Delta T$ has expired, a vehicle 26 that was initially at a back end of the region of interest 28 should now be close to the critical line 30, and will be a good candidate to be the new host to re-broadcast the message M.

This procedure is repeated every time $\Delta T$ so that one of the vehicles 26, typically the vehicle closest to the critical line 30, will re-broadcast the warning message just before all of the vehicles 26 with the warning message cross the critical line 30. Hence, the warning message M is always maintained in the region of interest 28 in an efficient and robust manner, and guarantees that every vehicle in the region of interest 28 that is behind the critical line 30 will receive the warning message. Each time the message is re-broadcast to a new group of vehicles within the region of interest 28, the broadcast timestamp $t_i$ and the message sequence number $S_i$ is updated.

The warning message should be removed when the hazardous region 24 does not exist anymore, otherwise an obsolete warning message can mislead vehicle drivers. Because the event duration significantly varies from instance to instance, it is technically infeasible to specify a pre-determined event duration that exactly matches the real duration of physical events. To address this challenge, the present invention uses a soft-date scheme to specify an expiration timer for each event. In this manner, the message re-broadcast will naturally die out when the time expires. Specifically, the warning messages are eliminated and corresponding re-broadcast timers are cancelled when the event itself is not valid anymore when time t is greater than time $t_0+T$, where T is the event lifetime, or the vehicle is out of the region of interest 28. However, if the hazard region 24 on the roadway 20 still exists when the event timer expires, a new instance of the event will be generated with a new time stamp by another vehicle detecting the hazard region 24. The process is repeated after the hazard region 24 is again detected.

FIG. 3 is a flow chart diagram 50 showing the process of the invention as discussed above. After the protocol is initiated at box 52, the algorithm determines whether a particular vehicle is in the region of interest 28 at decision diamond 54, and if not, the protocol ends at box 56. If a vehicle is in the region of interest 28 at the decision diamond 54, then the algorithm determines whether a specific event has timed out at decision diamond 58, and if so, the algorithm ends at the box 56. If the event has not timed out at the decision diamond 58, the algorithm determines whether a new event has been detected at the decision diamond 60. If a new event has been detected at the decision diamond 60, then the algorithm forms the warning message M at box 62 and causes the vehicle to broadcast the message M at box 64. If the algorithm determines that the event is not a new event at the decision diamond 60, then the algorithm determines whether the vehicle is receiving a new warning message at decision diamond 66. If the vehicle is receiving a new warning at the decision diamond 66, then the algorithm sets the timer $\Delta T$ at box 68. If the vehicle has not received a new warning message at the decision diamond 66, then the algorithm determines whether the vehicle should re-broadcast the message M at decision diamond 70. If the message M should be re-broadcast at the decision diamond 70, then the message M is formed at box 72 and then broadcast at box 74.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a warning message to a group of vehicles, said method comprising:
    detecting a hazardous situation by a detecting vehicle;
    broadcasting a warning message from the detecting vehicle;
    broadcasting the message by other vehicles until the message is received by all of the vehicles in a region of interest even if the detecting vehicle has left the region of interest;
    preventing the warning message from being broadcast for a first predetermined period of time after the vehicles in the region of the interest have received the message;
    selecting a host vehicle to re-broadcast the message after the first predetermined period of time has expired;
    preventing the message from being broadcast again for the first predetermined period of time;
    repeating the step of determining a host vehicle for re-broadcasting the message; and
    ending the broadcast of the message after a second predetermined period of time has expired.

2. The method according to claim 1 wherein selecting a host vehicle to re-broadcast the message includes setting a timer in each vehicle that has received the message in the region of interest and making the vehicle whose timer expires first as the host vehicle.

3. The method according to claim 2 wherein setting a timer includes setting the timer at a random time $t_i$ defined by:

$$t_i \in \left[0, k\frac{d_A}{D}\right]$$

where k is a constant, D is the distance from a critical line behind the hazardous situation to an end of the region of interest and $d_A$ is the distance from the critical line to the host vehicle.

4. The method according to claim 1 wherein the first predetermined period of time is defined as:

$$\Delta T = D/V_{max}$$

where $\Delta T$ is the first predetermined period of time, D is the distance from a critical line behind the hazardous situation to an end of the region of interest and $V_{max}$ is the maximum allowed velocity on the roadway within the region of interest.

5. The method according to claim 1 wherein broadcasting the message by other vehicles includes using a multi-hop geocast transmission scheme.

6. The method according to claim 1 wherein detecting the hazardous situation includes using a vehicle stability control system.

7. The method according to claim 1 wherein detecting the hazardous situation includes using a radar, lidar, vision or other sensing device.

8. The method according to claim 1 wherein the message has event information including event type, event location, event duration, and event detection time-stamp and message sequence number.

9. A method for providing a warning message of a hazardous road condition to a group of vehicles, said method comprising:
    detecting the hazardous road condition by a detecting vehicle;
    defining a region of interest along a roadway from a position just in front of the hazardous condition to a predetermined distance behind the hazardous condition;
    defining a critical line behind the hazardous road condition;
    defining a distance from the critical line to a back end of the region of interest;
    broadcasting a warning message from the detecting vehicle to other vehicles in the region of interest using a multi-hop geocast transmission scheme;
    preventing the warning message from being broadcast for a first predetermined period of time after the vehicles in the region of interest have received the message; and
    using a contentious timing process to determine which of the vehicles that have received the message in the region of interest will re-broadcast the message to new vehicles entering the region of interest after the first predetermined period of time even if the detecting vehicle has left the region of interest.

10. The method according to claim 9 wherein using a contentious timing process to determine which of the vehicles will re-broadcast the message includes setting a timer in each vehicle that has received the message in the region of interest and making the vehicle whose timer expires first as the re-broadcasting vehicle.

11. The method according to claim 10 wherein setting a timer includes setting the timer at a random time $t_i$ defined by:

$$t_i \in \left[0, k\frac{d_A}{D}\right]$$

where k is a constant, D is the distance from the critical line behind the hazardous situation to an end of the region of interest and $d_A$ is the distance from the critical line to the re-broadcasting vehicle.

12. The method according to claim 9 wherein the first predetermined period of time is defined as:

$$\Delta T = D/V_{max}$$

where $\Delta T$ is the first predetermined period of time, D is the distance from the critical line behind the hazardous situation to an end of the region of interest and $V_{max}$ is the maximum allowed velocity on the roadway within the region of interest.

13. The method according to claim 9 further comprising ending the broadcast of the message after a second predetermined period of time has expired that is determined based on a lifetime of the hazardous condition.

14. The method according to claim 9 wherein detecting the hazardous situation includes using a vehicle stability control system.

15. The method according to claim 9 wherein detecting the hazardous situation includes using a radar, lidar, vision or other sensing device.

16. The method according to claim 9 wherein the message has event information including event type, event location, event duration, event detection time-stamp, and message sequence number.

17. A method for providing a warning message to a group of vehicles, said method comprising:
   detecting a hazardous situation by a detecting vehicle;
   broadcasting a warning message from the detecting vehicle to be received by other vehicles even if the detecting vehicle has left the region of interest;
   providing a process by which the message is re-broadcast to a new set of vehicles after a predetermined period of time; and
   providing a process by which the message is not further re-broadcast after an event lifetime has expired.

18. The method according to claim 17 wherein providing a process by which the message is re-broadcast includes setting a timer in each vehicle that has received the message and making the vehicle whose timer expires first as the vehicle that re-broadcasts the message.

19. The method according to claim 18 wherein setting a timer includes setting the timer at a random time $t_i$ defined by:

$$t_i \in \left[0, k\frac{d_A}{D}\right]$$

where k is a constant, D is the distance from a critical line behind the hazardous situation to an end of a region of interest and $d_A$ is the distance from the critical line to the re-broadcast vehicle.

20. The method according to claim 17 wherein the first predetermined period of time is defined as:

$$\Delta T = D/V_{max}$$

where $\Delta T$ is the first predetermined period of time, D is the distance from a critical line behind the hazardous situation to an end of a region of interest and $V_{max}$ is the maximum allowed velocity on the roadway within the region of interest.

* * * * *